United States Patent
Sasaki et al.

(10) Patent No.: US 9,937,833 B2
(45) Date of Patent: Apr. 10, 2018

(54) SEATBACK FRAME AND VEHICLE SEAT

(71) Applicant: NHK SPRING CO., LTD., Yokohama-shi (JP)

(72) Inventors: Yoshitaka Sasaki, Yokohama (JP); Akitoshi Yamashita, Yokohama (JP); Tomo Ishibashi, Yokohama (JP); Hiroaki Inaba, Yokohama (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 1 day.

(21) Appl. No.: 14/794,637

(22) Filed: Jul. 8, 2015

(65) Prior Publication Data
US 2016/0009210 A1     Jan. 14, 2016

(30) Foreign Application Priority Data
Jul. 10, 2014   (JP) .................................. 2014-142428

(51) Int. Cl.
| | | |
|---|---|---|
| *B60N 2/68* | (2006.01) | |
| *B60N 2/56* | (2006.01) | |
| *B60N 2/42* | (2006.01) | |
| *B60N 2/427* | (2006.01) | |

(52) U.S. Cl.
CPC ......... *B60N 2/5657* (2013.01); *B60N 2/4228* (2013.01); *B60N 2/42709* (2013.01); *B60N 2/68* (2013.01); *B60N 2/686* (2013.01)

(58) Field of Classification Search
CPC ............................... B60N 2/686; B60N 2/4228
See application file for complete search history.

(56) References Cited

U.S. PATENT DOCUMENTS

| | | | | |
|---|---|---|---|---|
| 6,491,346 B1 * | 12/2002 | Gupta | ................ | B29C 49/4802 297/232 |
| 7,731,293 B1 * | 6/2010 | Donovan | ............... | B60N 2/686 297/452.18 |

(Continued)

FOREIGN PATENT DOCUMENTS

| | | |
|---|---|---|
| JP | S53-154524U U | 12/1978 |
| JP | 2000-118279 A | 4/2000 |

(Continued)

OTHER PUBLICATIONS

Japanese Office Action dated Jan. 30, 2018 for Application No. 2014-142428 in 5 pages.

*Primary Examiner* — Timothy J Brindley
(74) *Attorney, Agent, or Firm* — Knobbe, Martens, Olson & Bear, LLP (57) ABSTRACT

There is provided a seatback frame including: left and right side frames that are provided at left and right side portions of a seatback of a vehicle seat, with the respective lower end portions of the side frames coupled to a rear end portion of a seat cushion frame provided to a seat cushion of the vehicle seat; and a back face panel that is formed of sheet metal, that spans across between rear end portions of lower portions of the left and right side frames with its thickness direction along a seatback front-rear direction, that is fixed to the left and right side frames, and that includes an undulating shaped portion bent such that peaks and troughs alternate in a row along a seat width direction.

3 Claims, 7 Drawing Sheets

(56) References Cited

U.S. PATENT DOCUMENTS

| | | | | |
|---|---|---|---|---|
| 2003/0062759 A1* | 4/2003 | Gupta | B60N 2/3013 | 297/452.65 |
| 2007/0035163 A1* | 2/2007 | Andrews | B60N 2/4885 | 297/216.12 |
| 2011/0140480 A1* | 6/2011 | Nakamura | B60N 2/3013 | 296/187.05 |
| 2013/0015694 A1* | 1/2013 | Tosco | B60N 2/4808 | 297/452.18 |
| 2013/0140859 A1* | 6/2013 | Yamaki | B60N 2/4235 | 297/216.13 |
| 2013/0187417 A1* | 7/2013 | Seo | B60N 2/68 | 297/216.13 |
| 2013/0241259 A1* | 9/2013 | Pozzi | B60N 2/68 | 297/452.18 |
| 2014/0070594 A1* | 3/2014 | Awata | B60N 2/5825 | 297/452.48 |
| 2014/0084661 A1* | 3/2014 | Awata | B60N 2/5825 | 297/452.18 |
| 2014/0284987 A1* | 9/2014 | Yasuda | B60N 2/686 | 297/452.18 |
| 2014/0312676 A1* | 10/2014 | Ito | B60N 2/643 | 297/452.48 |
| 2015/0175038 A1* | 6/2015 | Kaneda | B60N 2/682 | 297/378.12 |
| 2015/0336489 A1* | 11/2015 | Kijima | B60N 2/686 | 297/188.01 |
| 2015/0352982 A1* | 12/2015 | Watanabe | B60N 2/68 | 297/354.12 |
| 2016/0096461 A1* | 4/2016 | Coppuck | B60N 2/4808 | 297/354.1 |
| 2016/0200232 A1* | 7/2016 | Tamura | B60N 2/68 | 297/452.18 |
| 2016/0221481 A1* | 8/2016 | Sugiyama | B60N 2/686 | |
| 2016/0236600 A1* | 8/2016 | Citron | B60N 2/686 | |

FOREIGN PATENT DOCUMENTS

| | | |
|---|---|---|
| JP | 2010-115313 A | 5/2010 |
| JP | 2012-056481 A | 3/2012 |
| JP | 2012-056482 A | 3/2012 |
| JP | 2012-056483 A | 3/2012 |
| JP | 2012-136058 A | 7/2012 |
| JP | 2012-136059 A | 7/2012 |
| JP | 2012-166725 A | 9/2012 |
| JP | 2012-232678 A | 11/2012 |
| JP | 2012-250596 A | 12/2012 |
| JP | 2013-086531 A | 5/2013 |
| JP | 2013-107490 A | 6/2013 |

\* cited by examiner

SEATBACK FRAME AND VEHICLE SEAT

CROSS-REFERENCE TO RELATED APPLICATION

This application is based on and claims priority under 35 USC 119 from Japanese Patent Application No. 2014-14428 filed on Jul. 10, 2014, the disclosure of which is incorporated by reference herein.

BACKGROUND

Technical Field

The present invention is related to a seatback frame provided to a seatback of a vehicle seat, and a vehicle seat.

Related Art

A vehicle seat described in Japanese Patent Application Laid-Open (JP-A) No. 2012-136058 includes a seat frame that is a frame of a seat unit on which an occupant sits, and a seatback frame supported by the seat frame. The seatback frame includes side frames including pipes extending along the up-down direction and disposed separated at the left and right, and a lower portion connecting member that is formed of sheet metal disposed spanning between lower portions of the left and right side frames and connects the left and right side frames together. The lower portion connecting member includes a rear wall portion connected to and supported by the side frames, and a front wall portion extending forward and downward from an upper end of the rear wall portion. A front face of the front wall portion is inclined so as to be parallel to an extension direction of the pipes of the side frames, or to face upward with respect to this extension direction, in side view. During a rear end collision, a sense imparted to an occupant of being struck by the lower portion connecting member is thereby alleviated. Note that JPA-No. 2012-136059 describes a similar vehicle seat to that described above.

In vehicle seats such as that described above, when an excess load is input to the lower portion connecting member from an occupant moving under inertia toward the seat rear side during a rear end collision, the lower portion connecting member deforms toward the seat rear side, and a tensile load is generated at fixing portions between the lower portion connecting member and the left and right side frames. There is accordingly a possibility of the fixing portions being damaged, and of load being transmitted to other members such as the left and right side frames, such that the other members are damaged.

SUMMARY

In consideration of the above circumstances, an object of the present invention is to obtain a seatback frame and a vehicle seat that contribute to suppressing damage during a rear end collision.

A first aspect of the present invention provides a seatback frame including:

left and right side frames that are provided at left and right side portions of a seatback of a vehicle seat, with the respective lower end portions of the side frames coupled to a rear end portion of a seat cushion frame provided to a seat cushion of the vehicle seat; and a back face panel that is formed of sheet metal, that spans across between rear end portions of lower portions of the left and right side frames with its thickness direction along a seatback front-rear direction, that is fixed to the left and right side frames, and that includes an undulating shaped portion bent such that peaks and troughs alternate in a row along a seat width direction.

The seatback frame of the first aspect of the present invention includes the back fare panel made of sheet metal that spans across between the rear end portions of the lower portions of the left and right side frames and is fixed to both frames. The back face panel includes the undulating shaped portion that is bent such that peaks and troughs alternate in a row along the seat width direction. Thus, when an excessive load is input to the back face panel from an occupant moving under inertia toward the seat rear side during a rear end collision, the load is dispersed by the back face panel stretching at the undulating shaped portion, reducing tensile load applied to fixing portions of the back face panel to the left and right side frames. This enables damage to the fixing portions or to other members such as the left and right side frames to be prevented or suppressed. This accordingly contributes to suppressing damage during a rear end collision.

A second aspect of the present invention provides the seatback frame of the first aspect, wherein the undulating shaped portion is provided at a seat width direction center portion of the back face panel.

In the seatback frame of the second aspect of the present invention, the undulating shaped portion is provided to the back face panel at the seat width direction center portion, where load toward the seat rear side is input from an occupant during a rear end collision. This enables the undulating shaped portion to be stretched in a desirable manner.

A third aspect of the present invention provides the seatback frame of the first aspect, wherein the undulating shaped portion is configured including plural sloping portions sloping within a range of 20° to 70° with respect to the seat width direction.

In the seatback frame of the third aspect of the present invention, due to the undulating shaped portion of the back face panel being configured as described above, component force along the seat width direction (seat left-right direction) can be made to act efficiently on both end portions of each of the plural sloping portions when load toward the seat rear side is input to the back face panel. This enables the undulating shaped portion to be stretched in a desirable manner.

A fourth aspect of the present invention provides the seatback frame of the first aspect, wherein the back face panel comprises a general portion extending along the seat width direction, and the undulating shaped portion forms a peak toward the seatback front side with respect to the general portion.

In the seatback frame of the fourth aspect of the present invention, due to the undulating shaped portion of the back face panel being configured as described above, there is no need to secure a placement space for the undulating shaped portion at a back face side of the seatback.

A fifth aspect of the present invention provides the seatback frame of the first aspect, wherein:

the back face panel comprises a left and right pair of the undulating shaped portions, and a general portion is provided extending along the seat width direction between the pair of undulating shaped portions; and an opening is formed to the general portion for inserting an air blower of an air conditioning mechanism attached to a back face side of the back face panel.

In the seatback frame of the fifth aspect of the present invention, the air blower of the air conditioning mechanism attached to the back face side of the back face panel is inserted through the opening formed in the general portion of the back face panel. Since the general portion is provided between the pair of left and right undulating shaped portions, the left and right undulating shaped portions each stretch when load toward the seat rear side is input to the back face panel, thereby enabling the load to be efficiently dispersed along the seat width direction, A sixth aspect of the present invention provides a vehicle seat including:

a seat cushion provided with a seat cushion frame; and the seatback frame of the first aspect, in which the respective lower end portions of the left and right side frames are coupled to a rear end portion of the seat cushion frame.

The vehicle seat of the sixth aspect of the present invention includes the seatback frame of any one of the first aspect to the fifth aspect, thereby obtaining similar operation and advantageous effects to the first aspect to the fifth aspect.

As explained above, the seatback frame and vehicle seat according to the present invention contribute to suppressing damage during a rear end collision.

BRIEF DESCRIPTION OF THE DRAWINGS

Exemplary embodiments of the present invention will be described in detail based on the following figures, wherein.

DETAILED DESCRIPTION

Explanation follows regarding a seatback frame 10 and a vehicle seat 12 according to an exemplary embodiment of the present invention, with reference to FIG. 1 to FIG. 10. Note that in each of the drawings, the arrow FR indicates the vehicle front direction, the arrow UP indicates the vehicle upward direction, and the arrow RH indicates the vehicle right direction as appropriate. Unless specifically stated otherwise, reference below to front-rear, left-right, and up-down directions refers to front and rear in the vehicle front-rear direction. left and right in the vehicle left-right direction (vehicle width direction), and up and down in the vehicle up-down direction.

Figure 1:
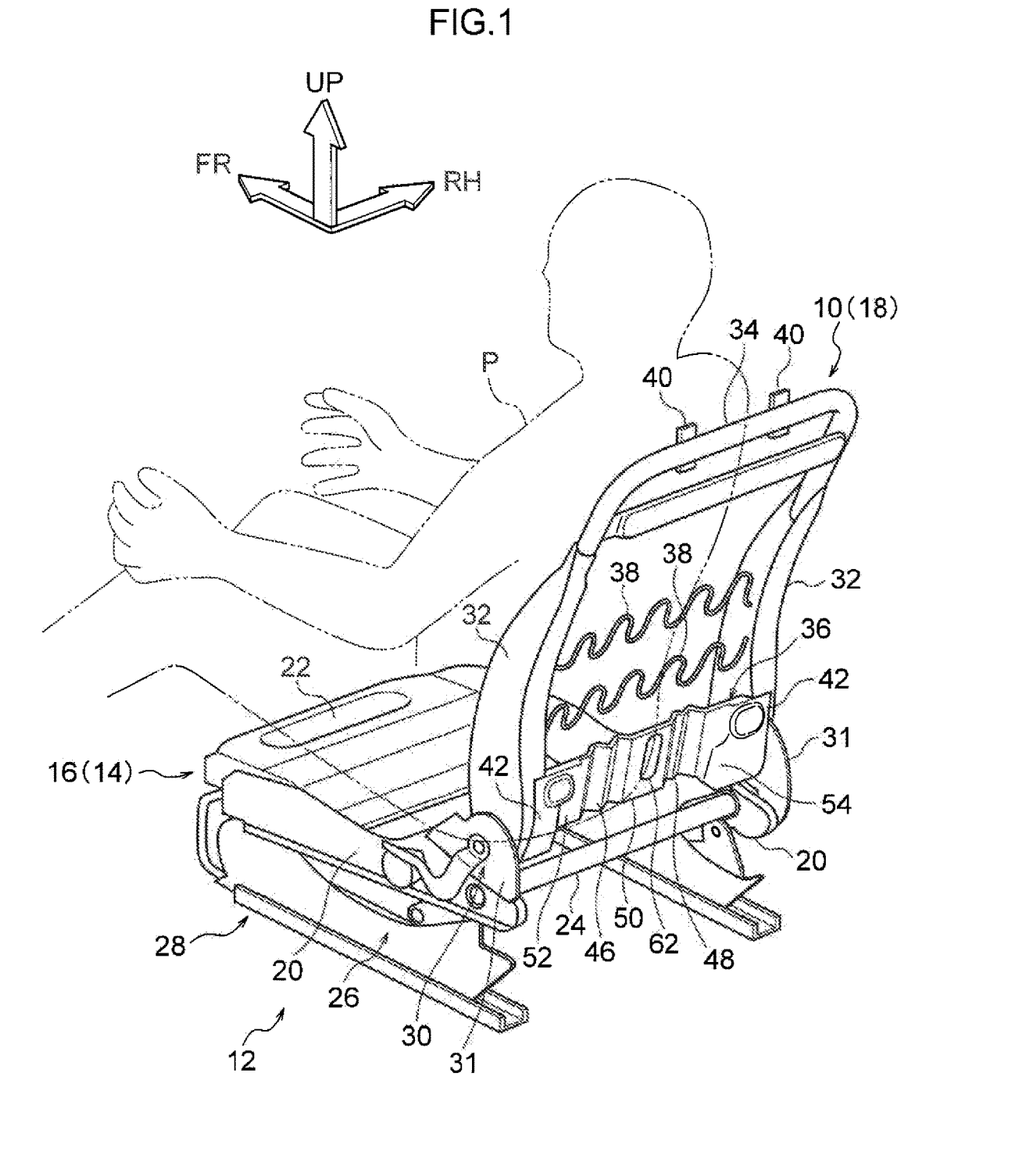
FIG. 1 is a perspective view illustrating a frame of a vehicle seat according to an exemplary embodiment of the present invention, in a state viewed obliquely from the seat rear side.

As illustrated in FIG. 1, the vehicle seat 12 according to the present exemplary embodiment includes a seat cushion frame 16 forming a frame of a seat cushion 14 on which an occupant P sits, and the seatback frame 10 forming a frame of a seatback 18 that supports the lumbar region and back of the occupant P. Configuration is such that pad members (neither of which are illustrated in the drawings), each covered by a cover, are attached to the seat cushion frame 16 and the seatback frame 10. The front-rear direction, left-right direction (width direction), and up-down direction of the vehicle seat 12 match the front-rear, left-right, and up-down directions of the vehicle.

The seat cushion frame 16 includes a pair of left and right side frames 20 extending along the seat front-rear direction at left and right side portions of the seat cushion 14, a front frame 22 spanning across between upper end portions at front portions of the left and right side frames 20, and a rear frame 24 spanning across between rear end portions of the left and right side frames 20.

The left and right side frames 20 are formed in elongated shapes using sheet metal or the like, and are disposed oriented with their length direction along the seat front-rear direction and their thickness direction along the seat width direction. The front frame 22 is formed in a substantially rectangular shape using sheet metal or the like and disposed oriented with its thickness direction along the seat up-down direction. Both seat width direction end portions of the front frame 22 are fixed by a means such as welding to the front portions of the left and right side frames 20. The rear frame 24 is formed of a metal pipe and disposed oriented with its axial direction along the seat width direction. Both seat width direction end portions of the rear frame 24 are rotatably coupled to the rear end portions of the left and right side frames 20 by a means such as crimping.

The left and right side frames 20 are coupled to a vehicle body floor through a known lifter mechanism 26 and configured including the rear frame 24, and a known seat slide mechanism 28. Positions in the vehicle up-down direction and positions in the vehicle front-rear direction of the left and right side frames 20 can be adjusted with respect to the vehicle body floor. The seatback frame 10 is coupled to the rear end portions of the left and right side frames 20 so as to be capable of reclining, using a known reclining mechanism 30.

The seatback frame 10 includes a pair of left and right side frames 32 extending along a seatback up-down direction (the height direction of the seatback 18) at left and right side portions of the seatback 18, an upper frame 34 spanning across between upper end portions of the left and right side frames 32, and a back face panel 36 spanning across between rear end portions of lower portions of the left and right side frames 32.

The left and right side frames 32 are formed in elongated shapes using sheet metal or the like, and are disposed oriented with their length direction along the seatback up-down direction and their thickness direction along the seat width direction. A pair of upper and lower serpentine springs 38 spans across between up-down direction intermediate portions of the left and right side frames 32. Both seat width direction end portions of each of the serpentine springs 38 are anchored to the left and right side frames 32, and the serpentine springs 38 support the pad member of the seatback 18 from the seat rear side, Left and right recliners 33 (not illustrated in FIG. 1, see FIG. 6 and FIG. 7), included in the reclining mechanism 30 previously mentioned, are fixed by a means such as welding to seat width direction outside faces at lower end portions of the left and right side frames 32. Left and right brackets 31, also included in the reclining mechanism 30, are fixed by a means such as welding to seat width direction outside faces of the left and right side recliners 33. The brackets 31 are fixed to the rear end portions of the side frames 20 by a means such as fastening using bolts. The lower end portions of the left and right side frames 32 are accordingly coupled to the rear end portions of the left and right side frames 20 through the reclining mechanism 30.

The upper frame 34 is formed by bending a metal pipe or the like, and has an inverted, substantially U-shaped profile in a seat front view. Lower end portions of the upper frame 34, at locations extending in the seatback up-down direction at the left and right side portions of the seatback 18, are fixed to the upper end portions of the left and right side frames 32 by a means such as welding. A pair of left and right headrest support brackets 40, for coupling a headrest, not illustrated in the drawings, are attached to an upper end portion of the upper frame 34.

The back face panel 36 is formed in an elongated shape using sheet metal, and is disposed oriented with its length direction along the seat width direction and its thickness direction along a seatback front-rear direction (the front-rear direction of the seatback 18). Both seat width direction end portions of the back face panel 36 are fixed by a means such as welding to the rear end portions of the lower portions of the left and right side frames 32, at left and right fixing portions 42, illustrated in FIG. 2. The back face panel 36 is provided so as to be positioned at a similar height to the lumbar region of the occupant P seated in the vehicle seat 12.

Figure 2:
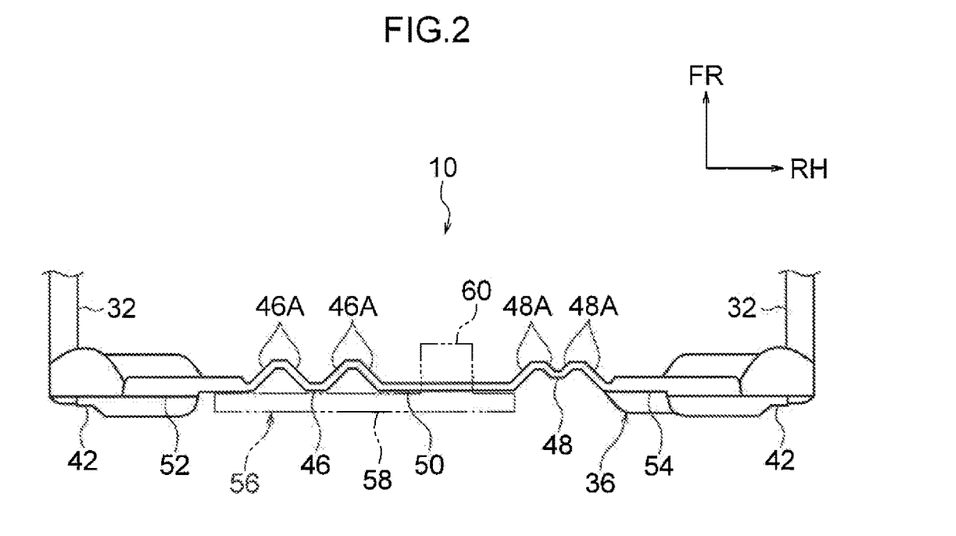
FIG. 2 is plan view illustrating a configuration peripheral to a back face panel of a seatback frame of the same vehicle seat.

A pair of left and right undulating shaped portions 46, 48 are provided at a seat width direction center portion (a seat width direction center portion and peripheral portions thereof) of the back face panel 36. The back face panel 36 is also integrally provided with a general portion 50 (hereafter referred to as a central general portion 50) positioned between the left and right undulating shaped portions 46, 48, and general portions 52, 54 (hereafter referred to as outside general portions 52, 54) extending toward the seat width direction outsides from the left and right undulating shaped portions 46, 48.

The central general portion 50 and the outside general portions 52, 54 extend in substantially flat shapes along the seat width direction, and seat width direction outside end portions of the left and right outside general portions 52, 54 are fixed to the left and right side frames 32 at the left and right fixing portions 42 previously mentioned.

The left and right undulating shaped portions 46, 48 are each formed by bending a portion of metal sheet configuring the back face panel 36 such that peaks and troughs alternate in a row along the vehicle width direction, and the undulating shape extends from an upper end to a lower end of the back face panel 36. In the present exemplary embodiment, the undulating shaped portions 46, 48 are each set with a substantially W-shaped cross-section open toward the seatback rear side, and form peaks toward the seatback front side of the central general portion 50 and the outside general portions 52, 54. In the undulating shaped portions 46, 48, plural sloping portions 46A, 48A, sloping within a range from 20° to 70° (for example, 45°) with respect to the seat width direction, are aligned in a zigzag shape along the seat width direction. Note that in the present exemplary embodiment, a seat width direction dimension of the undulating shaped portion 48 at the seat right side is set smaller than that of the undulating shaped portion 46 at the seat left side, due to relationships with peripheral members, not illustrated in the drawings.

Figure 3:
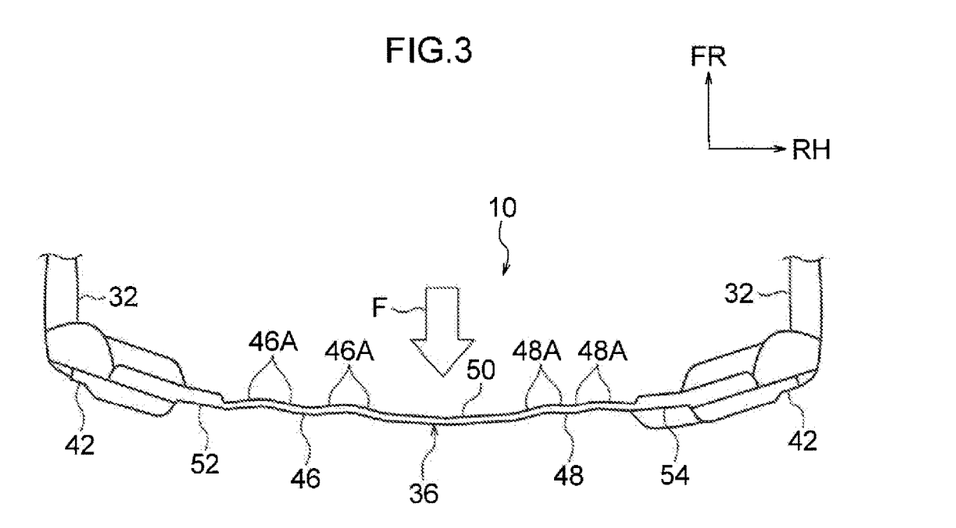
FIG. 3 is a plan view corresponding to FIG. 2, illustrating a state in which undulating shaped portions provided to the same back face panel have stretched due to load toward the seat rear side from an occupant during a rear end collision.
Figure 4:
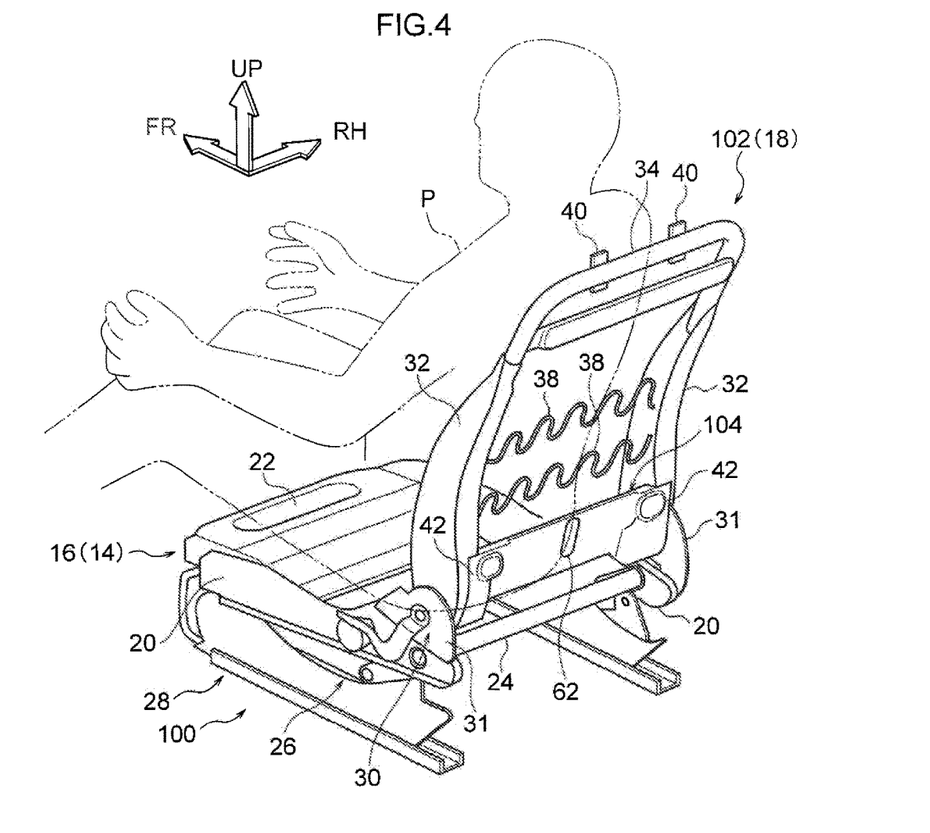
FIG. 4 is a perspective view corresponding to FIG. 1, illustrating a frame of a vehicle seat according to a Comparative Example.
Figure 5:
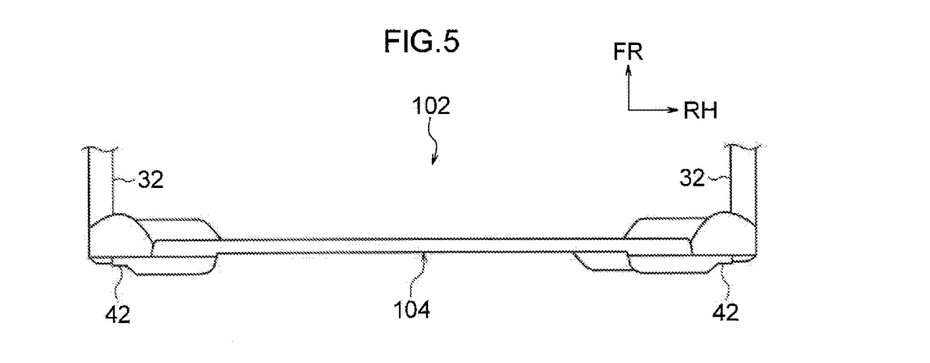
FIG. 5 is a plan view illustrating a configuration peripheral to a back face panel of a seatback frame of a vehicle seat according to a Comparative Example.
Figure 6:
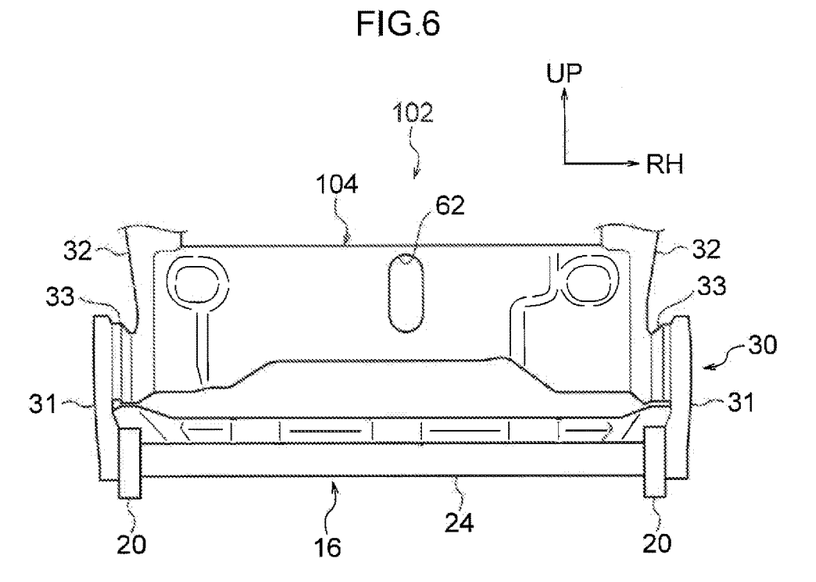
FIG. 6 is a back face view illustrating a configuration peripheral to a back face panel of a seatback frame according to a Comparative Example.
Figure 7:
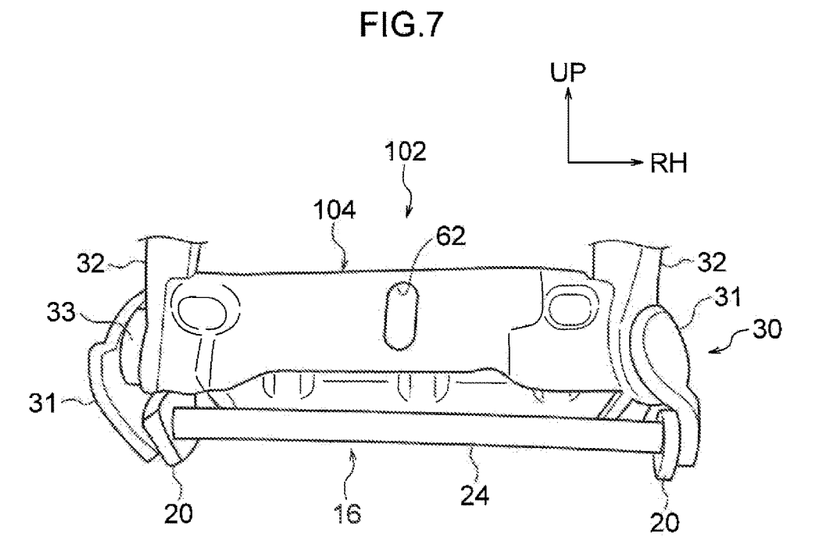
FIG. 7 is a back face view corresponding to FIG. 6, illustrating a state in which the periphery of a back face panel of a seatback frame according to a Comparative Example has been damaged due to load toward the seat rear side from an occupant during a rear end collision.

The undulating shaped portions 46, 48 may be understood to be excess length sections set at the seat width direction center portion of the back face panel 36, and a length direction (seat width direction) dimension of the back face panel 36 is compressed by the amount of set in the undulating shaped portions 46, 48. Thus, as illustrated in FIG. 3, configuration is such that when an excessive load F is input to the back face panel 36 from the seat front side, the length direction dimension of the back face panel 36 increases due to the undulating shaped portions 46, 48 stretching into flat shapes.

In the back face panel 36 with the above configuration, both upper and lower end portions of the left and right undulating shaped portions 46, 48, the central general portion 50, and the outside general portions 52, 54 are folded into flange shapes extending toward the seat front side. This increases the surface rigidity of the back face panel 36.

As illustrated hi FIG. 2, an air conditioning mechanism 56 (not illustrated in FIG. 1 and FIG. 3), for conveying air to the occupant P seated in the vehicle seat 12, is attached to a back face side (seatback rear side) of the back face panel 36. The air conditioning mechanism 56 includes a main body 58 formed in a flattened box shape along the seatback front-rear direction with its length direction along the seat width direction, and an air blower 60 projecting out from one length direction end portion of the main body 58 toward the seat front side. The air blower 60 is inserted through an opening 62 formed to the central general portion 50, and projects out toward the seatback front side of the back face panel 36.

Note that the shape, number, and height of the peaks and troughs, and the angle of slope (slope angle) of the sloping portions 46A, 48A with respect to the seat width direction, etc, of the undulating shaped portions 46, 48 is not limited to the above configuration, and may be changed as appropriate according to a target stretched dimension when the back face panel 36 is stretched at the undulating shaped portions 46, 48 as previously described, and relationships with peripheral members, etc.

However, taking the length direction dimension of the back face panel 36 prior to stretching as 100%, it is preferable that the length direction dimension of the back face panel 36 in a state after stretching is set between 110% and 160%. The angle of slope (slope angle) of the sloped portions 46A, 48A with respect to the seat width direction is preferably set within a range of 20° to 70°, more preferably set within a range of 30° to 60°, and most preferably set at 45°.

Operation and Advantageous Effects

Explanation follows regarding operation and advantageous effects of the present exemplary embodiment.

In the vehicle seat 12 with the above configuration, the back face panel 36 made of sheet metal spans across between the rear end portions of the lower portions of the left and right side frames 32 of the seatback frame 10. The back face panel 36 is disposed at a similar height to the lumbar region of the occupant P seated in the vehicle seat 12, and both seat width direction end portions are fixed to the left and right side frames 32. The pair of left and right undulating shaped portions 46, 48, formed bent such that peaks and troughs alternate in a row along the seat width direction, are provided to the back face panel 36.

In the event of a rear end collision, the occupant P moves under inertia toward the seat rear side due to the impact, and the lumbar region and back of the occupant P enter between the left and right side frames 32. As illustrated in FIG. 3, when the excessive load F (see FIG. 3) from the lumbar region of the occupant P is input to the back face panel 36 through the pad member of the seatback 18, the back face panel 36 is stretched at the undulating shaped portions 46, 48, and deforms so as to bulge toward the seatback rear side. The load F is thereby distributed and absorbed, and tensile load applied to the back face panel 36, the left and right side frames 32, and the fixing portions 42 is reduced, This enables damage to the fixing portions 42 or to other members such as the left and right side frames 32 to be prevented or suppressed. This therefore contributes to suppressing damage during a rear end collision.

Detailed explanation follows regarding the above advantageous effect, with reference to a vehicle seat 100 (a Comparative Example) illustrated in FIG. 4 to FIG. 7. In the vehicle seat 100, configuration other than a back face panel 104 of a seatback frame 102 is similar to that in the present exemplary embodiment. Although the back face panel 104 does not include the undulating shaped portions 46, 48 of the present exemplary embodiment and is formed with a flat profile overall, other configuration thereof is similar to that of the back face panel 36.

When the load F (see FIG. 3, not illustrated in FIG. 4 to FIG. 7) toward the seat rear side is input to the back face panel 104, an excessive tensile load toward the seat width direction inside is acts on the left and right fixing portions 42 due to the back face panel 104 attempting to deform toward the seat rear side. There is accordingly a concern of damage to peripheral members, including the left and right fixing portions 42.

Specifically, there is a concern of fractures or cracks occurring in the left and right fixing portions 42 due to the tensile load, and a concern of tensile load being transmitted to the left and right side frames 32, the reclining mechanism 30, and the left and right side frames 20, such that deformation or fracturing occurs in these members. There is accordingly a need to increase the plate thickness or strengthen the material of these members in order to prevent this.

In contrast thereto, in the present exemplary embodiment, deformation, fracturing, and so on such as that described above can be efficiently prevented or suppressed due to the back face panel 36 stretching as previously described. This enables better use of materials, for example by reducing plate thickness or changing materials in the respective members including the back face panel 36, thereby contributing to simplifying the configuration of the seatback frame 10.

In the present exemplary embodiment, the undulating shaped portions 46, 48 are provided to the back face panel 36 at the seat width direction center portion, where the load F from the occupant P toward the seat rear side is input during a rear end collision. This facilitates uniform left and right stretching of the undulating shaped portions 46, 48, thereby enabling the undulating shaped portions 46, 48 to be stretched in a desirable manner. This enables the load F from the occupant P to be efficiently distributed and absorbed.

In the present exemplary embodiment, the undulating shaped portions 46, 48 are configured including the plural sloping portions 46A, 48A sloping within the range of 20° to 70° with respect to the seal width direction, Thus, when load toward the seat rear side is input to the back face panel 36, component forces along the seat width direction (seat left-right direction) can be made to act efficiently on both end portions of each of the plural sloping portions 46A, 48A. This enables the undulating shaped portions 46, 48 to be stretched in a desirable manner.

Figure 8:
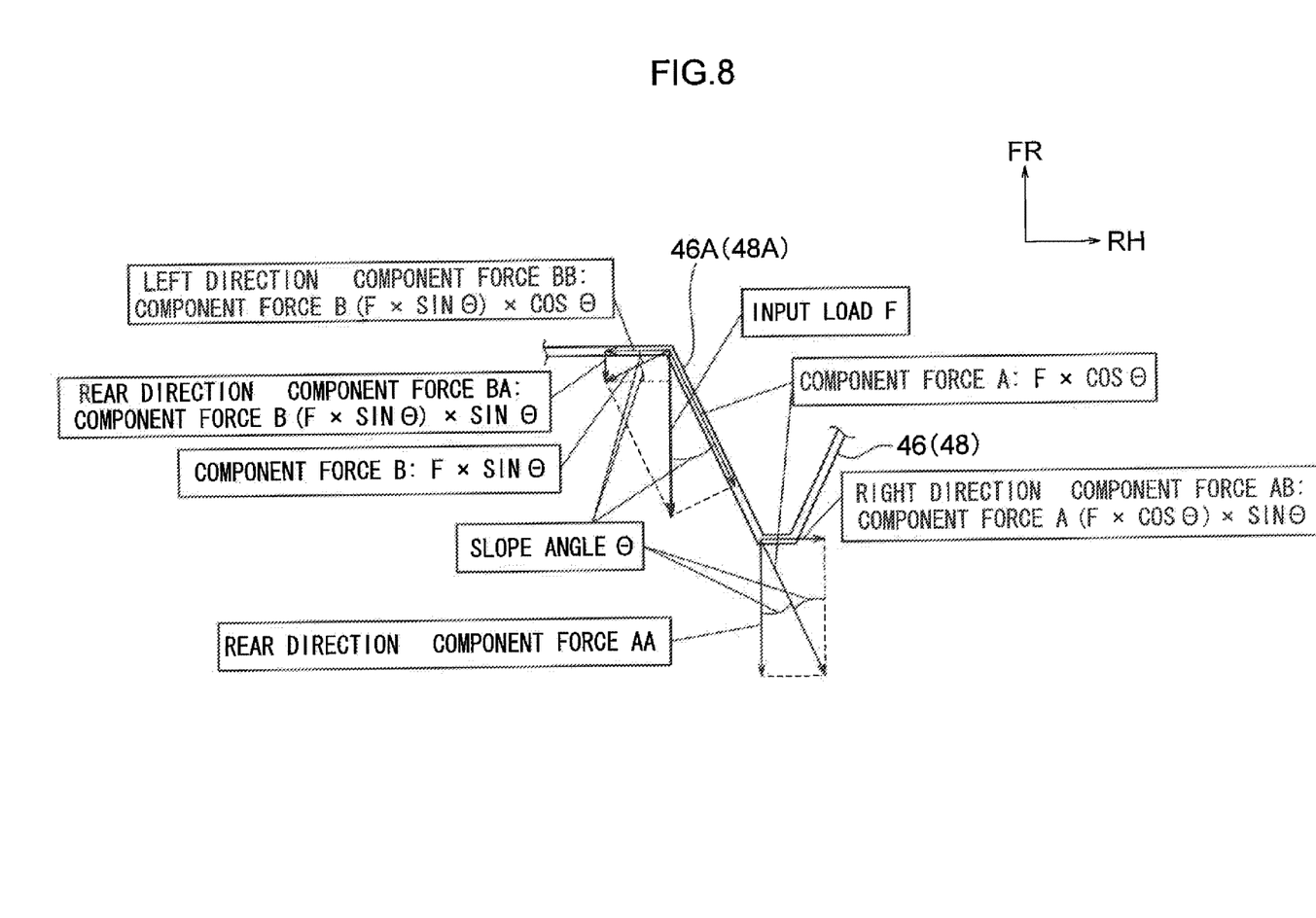
FIG. 8 is an explanatory drawing for explaining component forces acting on an undulating shaped portion during a rear end collision.
Figure 9:
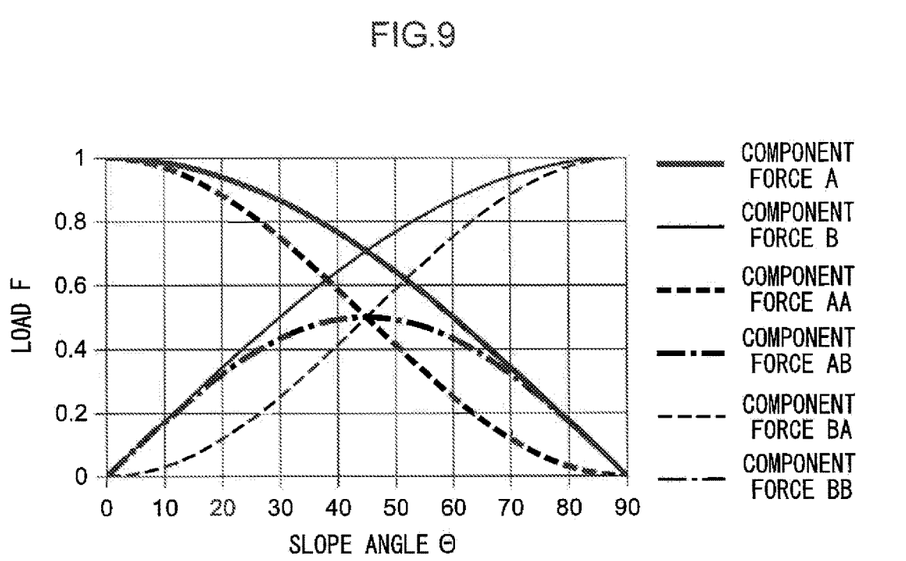
FIG. 9 is a line graph illustrating relationships between the size of respective component forces with respect to slope angle arid input load illustrated in FIG. 8.

Namely, when the load F toward the seat rear side is input to the undulating shaped portions 46, 48, component forces as illustrated in FIG. 8 act on each of the sloped portions 46A, 48A of the undulating shaped portions 46, 48. As illustrated in FIG. 9, a right direction component force Ab and a left direction component force Bb illustrated in FIG. 8 increase when an angle of slope (slope angle) θ of each of the sloping portions 46A, 48A with respect to the seat width direction is within the range of 20° to 70°, and are at maximum when the angle of slope θ is at 45°. Thus, as in the present exemplary embodiment, the undulating shaped portions 46, 48 can be efficiently stretched due to the plural sloped portions 46A, 48A of the undulating shaped portions 46, 48 sloping within the range of 20° to 70° with respect to the seat width direction. This enables the load F to be efficiently distributed along the seat left-right direction.

The back face panel 36 of the present exemplary embodiment includes the central general portion 50 and the left and right outside general portions 52, 54 extending along the seat width direction, and the undulating shaped portions 46, 48 form peaks toward the seatback front side with respect to the central general portion 50 and the outside general portions 52, 54. There is accordingly no need to secure a placement space for the undulating shaped portions 46, 48 at the back face side of the seatback 18, thereby enabling an increase to be avoided in the thickness dimension of the seatback 18 due to the placement space of the undulating shaped portions 46, 48. Even when the air conditioning mechanism 56 is attached to the back face side of the back face panel 36 as in the present exemplary embodiment, a placement space for the air conditioning mechanism 56 can be easily secured.

In the present exemplary embodiment, the air blower 60 of the air conditioning mechanism 56 is inserted through the opening 62 formed to the central general portion 50 of the back face panel 36. Since the central general portion 50 is provided between the pair of left and right undulating shaped portions 46, 48, stretching of the respective left and right undulating shaped portions 46, 48 when the load F toward the seat rear side is input to the back face panel 36 enables the load F to be efficiently distributed along the seat width direction.

Figure 10:
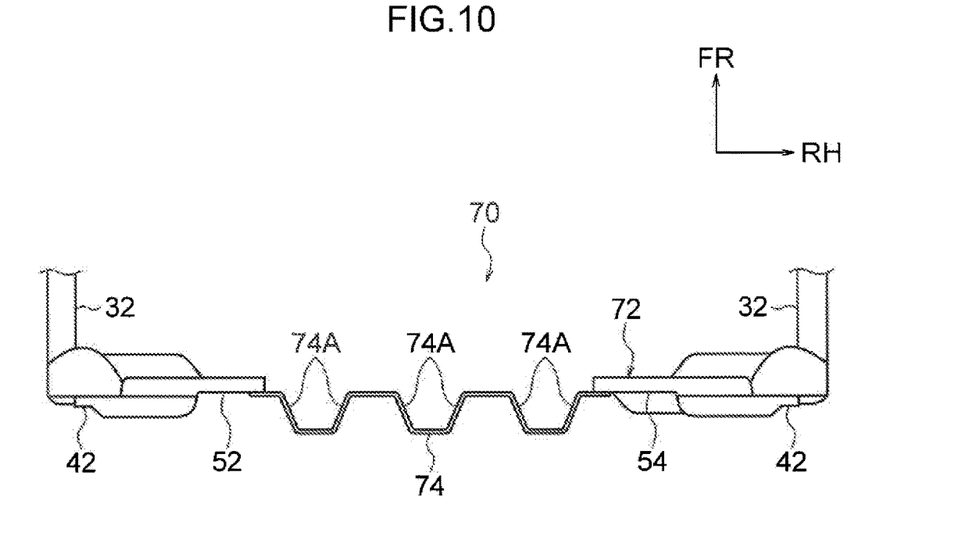
FIG. 10 is a plan view corresponding to FIG. 2, illustrating another example of a back face panel.

In the present exemplary embodiment, the undulating shaped portions 46, 48 are configured integrally formed (molded) to the central general portion 50 and the outside general portions 52, 54 of the back face panel 36; however the present invention is not limited thereto., and configuration may be as in a back face panel 72 of another example 70 illustrated in FIG. 10. In the back face panel 72, both seat width direction end portions of an undulating shaped portion 74 molded as a separate body to the outside general portions 52, 54 are fixed by a means such as welding to seat width direction inside end portions of the outside general portions 52, 54, and the central general portion 50 is omitted.

In the above exemplary embodiment. the cross-section profile of each of the undulating shaped portions 46, 48 is configured formed in a substantially W-shape (zigzag shape); however the present invention is not limited thereto, and peaks and troughs with hat shaped cross-sections may be formed in a row along the seat width direction, as in the undulating shaped portion 74 of the other example 70. In the undulating shaped portion 74 also, the undulating shaped portion 74 can be efficiently stretched by plural sloping portions 74A sloping within the range of 20° to 70° with respect to the seat width direction.

In the above exemplary embodiment, the undulating shaped portions 46, 48 are configured provided at the seat width direction center portion of the back face panel 36; however the present invention is not limited thereto, and undulating shaped portions may be configured respectively provided at both seat width direction end portions of a back face panel, or undulating shaped portions may be configured respectively provided at a seat width direction center portion and both seat width direction end portions of a back face panel.

Various other modifications may be implemented within a range not departing from the spirit of the present invention. It goes without saying the scope of rights of the present invention is not limited by the above exemplary embodiment.

What is claimed is:

1. A seatback frame comprising:
   left and right side frames that are provided at left and right side portions of a seatback of a vehicle seat, with the respective lower end portions of the side frames coupled to a rear end portion of a seat cushion frame provided to a seat cushion of the vehicle seat; and
   a back face panel that is formed of one piece of sheet metal, that spans across between rear end portions of lower portions of the left and right side frames with its thickness direction along a seatback front-rear direction, that is fixed to the left and right side frames, and that includes an undulating shaped portion bent such that peaks and troughs alternate in a row along a seat width direction, wherein:
   the back face panel comprises a left and right pair of the undulating shaped portions, and a general portion is provided extending along the seat width direction between the pair of undulating shaped portions; and
   an opening is formed to the general portion for inserting an air blower of an air conditioning mechanism attached to a back face side of the back face panel.

2. The seatback frame of claim 1, wherein the undulating shaped portion is configured including a plurality of sloping portions sloping within a range of 20° to 70° with respect to the seat width direction.

3. A vehicle seat comprising:
   a seat cushion provided with a seat cushion frame; and
   the seatback frame of claim 1, in which the respective lower end portions of the left and right side frames are coupled to a rear end portion of the seat cushion frame.

* * * * *